(12) United States Patent
Matsumura

(10) Patent No.: US 11,680,650 B2
(45) Date of Patent: Jun. 20, 2023

(54) FOUR-POSITION SWITCHING VALVE

(71) Applicant: SMC CORPORATION, Tokyo (JP)

(72) Inventor: Kenichi Matsumura, Kashiwa (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/656,093

(22) Filed: Mar. 23, 2022

(65) Prior Publication Data

US 2022/0333702 A1 Oct. 20, 2022

(30) Foreign Application Priority Data

Apr. 15, 2021 (JP) .............................. JP2021-069090

(51) Int. Cl.
*F16K 11/07* (2006.01)
*F16K 27/04* (2006.01)

(52) U.S. Cl.
CPC ........ *F16K 11/0712* (2013.01); *F16K 27/041* (2013.01)

(58) Field of Classification Search
CPC ............................ F16K 11/0712; F16K 27/041
See application file for complete search history.

(56) References Cited

U.S. PATENT DOCUMENTS

| | | | | |
|---|---|---|---|---|
| 3,160,174 A | * | 12/1964 | Schmiel | ............ F15B 13/0402 91/464 |
| 4,354,527 A | * | 10/1982 | McMillan | ............ F15B 13/042 91/464 |
| 4,355,660 A | * | 10/1982 | Huffman | ............ F15B 13/0402 91/464 |
| 5,038,825 A | * | 8/1991 | Hilmer | ................ F15B 13/0402 91/464 |
| 5,353,686 A | | 10/1994 | Nakamura | |
| 9,523,442 B2 | * | 12/2016 | Hayashi | .............. F16K 11/0704 |
| 2012/0255617 A1 | | 10/2012 | Miyazoe et al. | |

FOREIGN PATENT DOCUMENTS

| | | |
|---|---|---|
| GB | 1 466 059 A | 3/1977 |
| JP | 4117636 B2 | 7/2008 |
| JP | 4277240 B2 | 6/2009 |

OTHER PUBLICATIONS

Extended European Search Report dated Jul. 27, 2022, in corresponding European Patent Application No. 22167024.3 citing documents 1, 2 and 15 therein, 8 pages.

\* cited by examiner

*Primary Examiner* — Kevin R Barss
(74) *Attorney, Agent, or Firm* — Obion, McClelland, Maier & Neustadt, L.L.P.

(57) ABSTRACT

A four-position switching valve includes first and second pistons for driving a spool in a valve body, and a spool moving mechanism part that moves the spool to first and second intermediate switching positions between one-end side and the other-end-side switching positions. The spool moving mechanism part includes a compression spring that moves the spool back in the opposite direction by moving to the switching position on one end side and the other end side of the spool. The compression spring moves the spool to the first intermediate switching position when the spool moves to one-end-side switching position and the pressure on the second piston is released, and moves the spool to the second intermediate switching position when the spool moves to the other-end-side switching position and the pressure on the first piston is released.

6 Claims, 6 Drawing Sheets

FOUR-POSITION SWITCHING VALVE

TECHNICAL FIELD

The present invention relates to a four-position switching valve that switches a spool to four switching positions by means of pilot air pressure and a return spring.

BACKGROUND ART

As disclosed in, for example, Patent Literatures 1 and 2, the four-position switching valves of this type have been known. A known four-position switching valve is configured such that pistons are provided on both ends of a cylindrical outer spool slidably accommodated in a valve hole formed in a body, an inner spool is slidably provided in an inner hole formed inside the outer spool, and compression springs are disposed between both ends of the inner spool and the pistons opposed thereto.

When a pilot air pressure is applied to one piston through one pilot valve with the spring forces of the return springs being applied to the inner spool, the outer spool and the inner spool move in one direction and are switched to a one-end-side switching position, and when the pilot air pressure is applied to the other piston through the other pilot valve, the outer spool and the inner spool move in the opposite direction and are switched to the other-end-side switching position.

When the pilot valves are turned off to release both pistons from the effect of the pilot air pressure in a state in which both spools have moved to the one-end-side switching position, the spools are switched to a first intermediate switching position by the return springs, whereas, when the pilot valves are turned off to release both pistons from the effect of the pilot air pressure in a state in which both spools have moved to the other-end-side switching position, the spools are switched to a second intermediate switching position by the return springs.

When both spools are switched to the one-end-side switching position, the switching valve becomes in a first communication state, in which some of a plurality of ports communicate with one another while the others are shut off, and when both spools are switched to the other-end-side switching position, the switching valve becomes in a second communication state, which differs from the first communication state in the communication/shut-off relationship among the plurality of ports. When both spools are switched to the first intermediate switching position, a third communication state is established, in which some of the plurality of ports are shut off while the other ports communicate with the air, and when both spools are switched to the second intermediate switching position, the switching valve becomes in a fourth communication state, which differs from the third communication state in the shut-off/communication-with-the-air relationship among the plurality of ports.

CITATION LIST

Patent Literature

PTL 1: Japanese Patent No. 4117636
PTL 2: Japanese Patent No. 4277240

SUMMARY OF INVENTION

Technical Problem

In these four-position switching valves disclosed in Patent Literatures 1 and 2, because two spools and two return springs are provided in the valve hole, the component count increases. This makes the structure of the switching valve complex, inevitably making the manufacturing process difficult.

The technical problem of the present invention is to simplify the structure of the switching valve to provide an easy-to-manufacture four-position switching valve.

Solution to Problem

To solve this problem, a four-position switching valve according to the present invention includes: a body having a valve hole extending from one end side toward the other end side in an axial direction and a plurality of ports communicating with the valve hole; a spool accommodated in the valve hole in the body so as to be slidable in the axial direction; a first driving part that is disposed at one end of the spool in the axial direction and presses the spool toward the other end side in the axial direction to move the spool to another end-side switching position; a second driving part that is disposed at the other end of the spool in the axial direction and presses the spool toward one end side in the axial direction to move the spool to a one-end-side switching position; and a spool moving mechanism part that selectively moves the spool to a first intermediate switching position and a second intermediate switching position, which are located between the one-end-side switching position and the other-end-side switching position and differ from each other. The communication state among the plurality of ports is switched by moving the spool to the four switching positions with the first and second driving parts and the spool moving mechanism part. The spool moving mechanism part has a spring member that accumulates an elastic force for pushing-back the spool in the direction of the one-end-side switching position as the first driving part moves the spool to the other-end-side switching position and accumulates an elastic force for pushing-back the spool in the direction of the other-end-side switching position as the second driving part moves the spool to the one-end-side switching position, whereby the spool moving mechanism part presses the spool toward the other end side in the axial direction with the elastic force of the spring member and moves the spool to the first intermediate switching position when the pressure applied to the spool by the second driving part is removed in a state in which the spool has been moved to the one-end-side switching position, and presses the spool toward one side in the axial direction with the elastic force of the spring member and moves the spool to the second intermediate switching position when the pressure applied to the spool by the first driving part is removed in a state in which the spool has been moved to the other-end-side switching position.

In this case, it is preferable that: the spool has a coaxial spring washer shaft; the spool moving mechanism part further has a first spring washer at one end side in the axial direction and a second spring washer at the other end side in the axial direction on the spring washer shaft so as to be movable in the axial direction; the spring member is provided between the first spring washer and the second spring washer; the spring washer shaft has a pair of contact portions at both ends in the axial direction with which the first and second spring washers come into contact; the spring member is contracted in a state in which the first and second spring washers are in contact with the pair of contact portions; the valve hole in the body has, on both sides thereof in the axial direction with the spool moving mechanism part therebetween, a pair of stopper portions with which the first and second spring washers come into contact; and the relationships X<Y and Y−X<S1, S2 are satisfied, where X is the length between the pair of contact portions in the axial direction, Y is the length between the pair of stopper portions in the axial direction, and S1 and S2 are the stroke lengths of the spool with the first and second driving parts, respectively.

Furthermore, it is preferable that: the valve hole is provided with a spring accommodating chamber that accommodates the spool moving mechanism part and extends in the axial direction; the spring accommodating chamber has a pair of end walls extending radially outward at both ends in the axial direction; and the pair of end walls respectively include the stopper portions with which the first and second spring washers come into contact. Furthermore, it is preferable that: the inside diameter of the spring accommodating chamber is larger than the inside diameter of the valve hole; and the outside diameters of the first spring washer and the second spring washer are larger than the inside diameter of the valve hole and smaller than the inside diameter of the spring accommodating chamber.

Furthermore, it is preferable that: the pair of contact portions include a first step portion that projects radially outward from one end of the spring washer shaft in the axial direction and can come into contact with the first spring washer and a second step portion that projects radially outward from the other end of the spring washer shaft in the axial direction and can come into contact with the second spring washer; and the spool is switched to the first intermediate switching position in a state in which the first spring washer is in contact with the end wall and the first step portion of the spring accommodating chamber on one side in the axial direction and in which the second spring washer is in contact with the second step portion, and is switched to the second intermediate switching position in a state in which the second spring washer is in contact with the end wall and the second step portion of the spring accommodating chamber on the other side in the axial direction and in which the first spring washer is in contact with the first step portion.

Furthermore, it is preferable that: the plurality of ports include a supply port, a first output port, a second output port, a first discharging port, and a second discharging port; a first non-communication state, in which the supply port, the first output port, the second output port, and the first discharging port are shut off and do not communicate with one another, is established at the one-end-side switching position; a first communication state, in which the first output port and the first discharging port are shut off and do not communicate with each other while the supply port and the second output port communicate with each other, is established at the first intermediate switching position; a second non-communication state, in which the supply port, the first output port, the second output port, the first discharging port, and the second discharging port are all shut off and do communicate with one another, is established at the second intermediate switching position; and a second communication state, in which the second output port, the first discharging port, and the second discharging port are shut off and do not communicate with one another while the supply port and the first output port communicate with each other, is established at the other-end-side switching position.

Furthermore, it is preferable that: the plurality of ports have the supply port, the first output port, the second output port, the first discharging port, and the second discharging port; and a third communication state, in which the supply port, the second output port, and the second discharging port are shut off and do not communicate with one another while the first output port and the first discharging port communicate with each other, is established at the other-end-side switching position.

Advantageous Effects of Invention

As described above, the present invention can simplify the structure of the switching valve to provide an easy-to-manufacture four-position switching valve.

DESCRIPTION OF EMBODIMENTS

A four-position switching valve according to an embodiment of the present invention will be described below. In this embodiment, a pilot-type four-position switching valve will be described as an example. The fluid flowing through the four-position switching valve is compressed air.

FIGS. 1 to 5 show the detailed configuration of the four-position switching valve according to the embodiment of the present invention, and the four-position switching valve has a five-port valve configuration.

Figure 1:
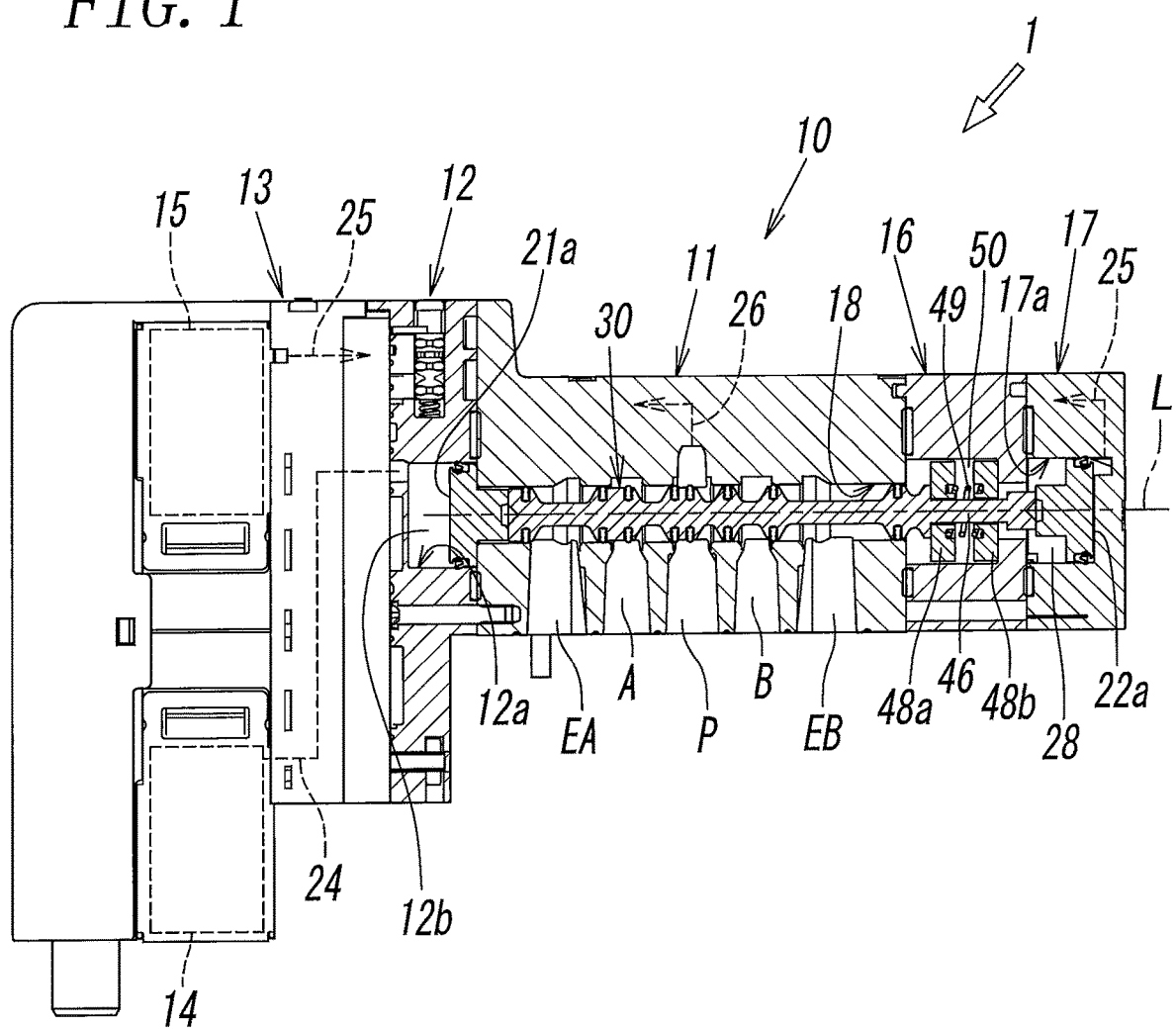
FIG. 1 is a relevant-part cross section of a four-position switching valve according to an embodiment of the present invention.
Figure 2:
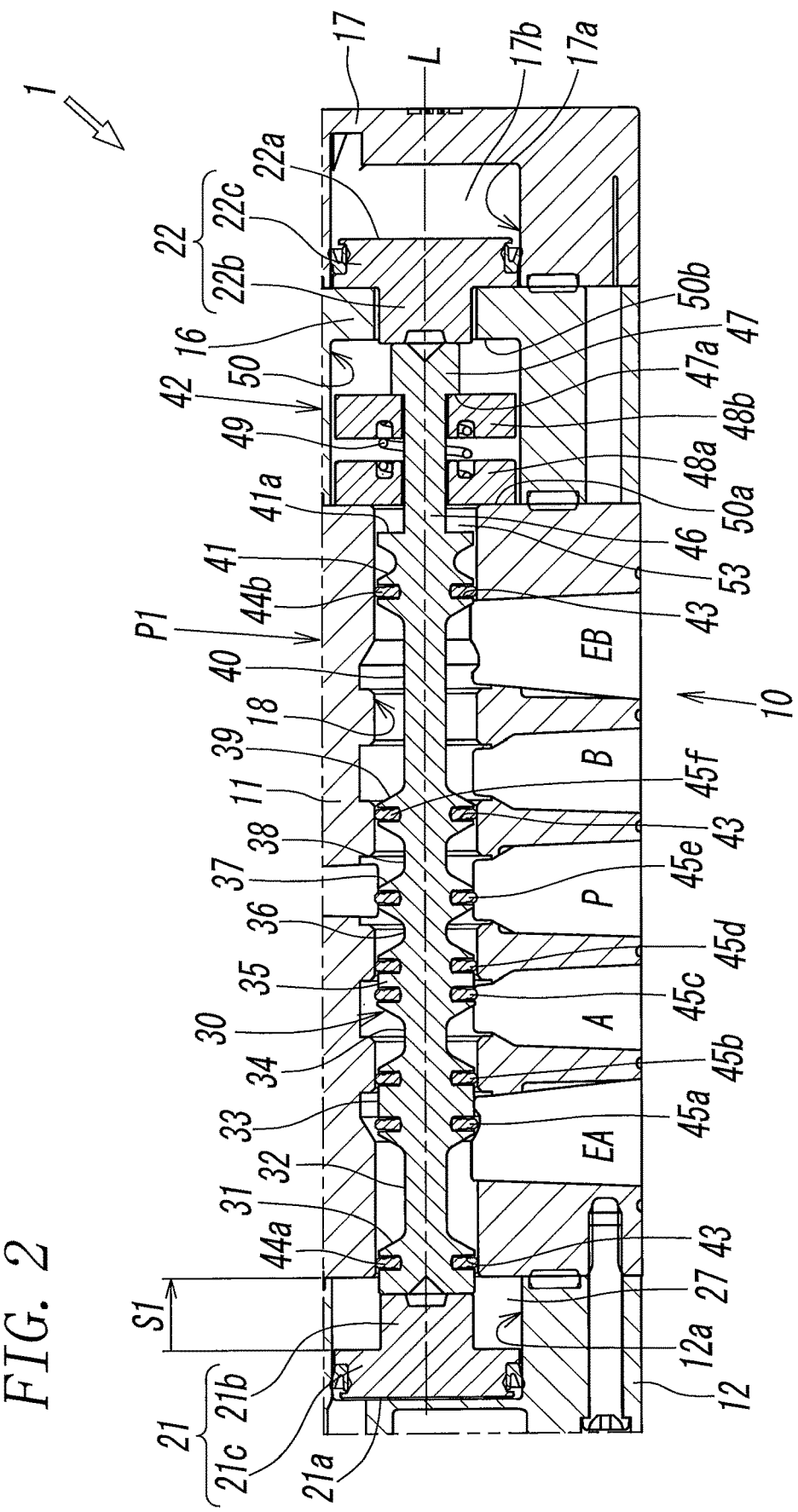
FIG. 2 is a partial cross section of the four-position switching valve in a state in which a spool has been moved to a one-end-side switching position.

As shown in FIGS. 1 and 2, a four-position switching valve 1 has a valve body 10 extending in an axis L direction. The valve body 10 includes: a main body 11 having five ports EA, A, P, B, and EB from one end side in the axis L direction toward the other end side in the axis L direction; a first piston cover 12 and a pilot valve part 13 joined in sequence to one end of the main body 11 in the axis L direction; a spring cover 16 and a second piston cover 17 joined in sequence to the other end of the main body 11 in the axis L direction.

The five ports are: a supply port P in the middle in the axis L direction; a first output port A and a second output port B located on both sides of the supply port P; a first discharging port EA located closer to the first piston cover 12 than the first output port A is; and a second discharging port EB located closer to the second piston cover 17 than the second output port B is.

A valve hole 18 having a circular cross section and with which the five ports communicate penetrates through the main body 11 and the spring cover 16 in the axis L direction. A spool 30 is inserted in the valve hole 18 so as to be slidable in the axis L direction of the valve hole 18. The length of the spool 30 in the axis L direction is slightly smaller than that of the valve hole 18. A first piston 21 (first driving part) and a second piston 22 (second driving part) slidably accommodated in piston chambers 12a and 17a are provided at one end and the other end of the spool 30 in the axis L direction so as to come into contact therewith and be separated therefrom.

Figure 3:
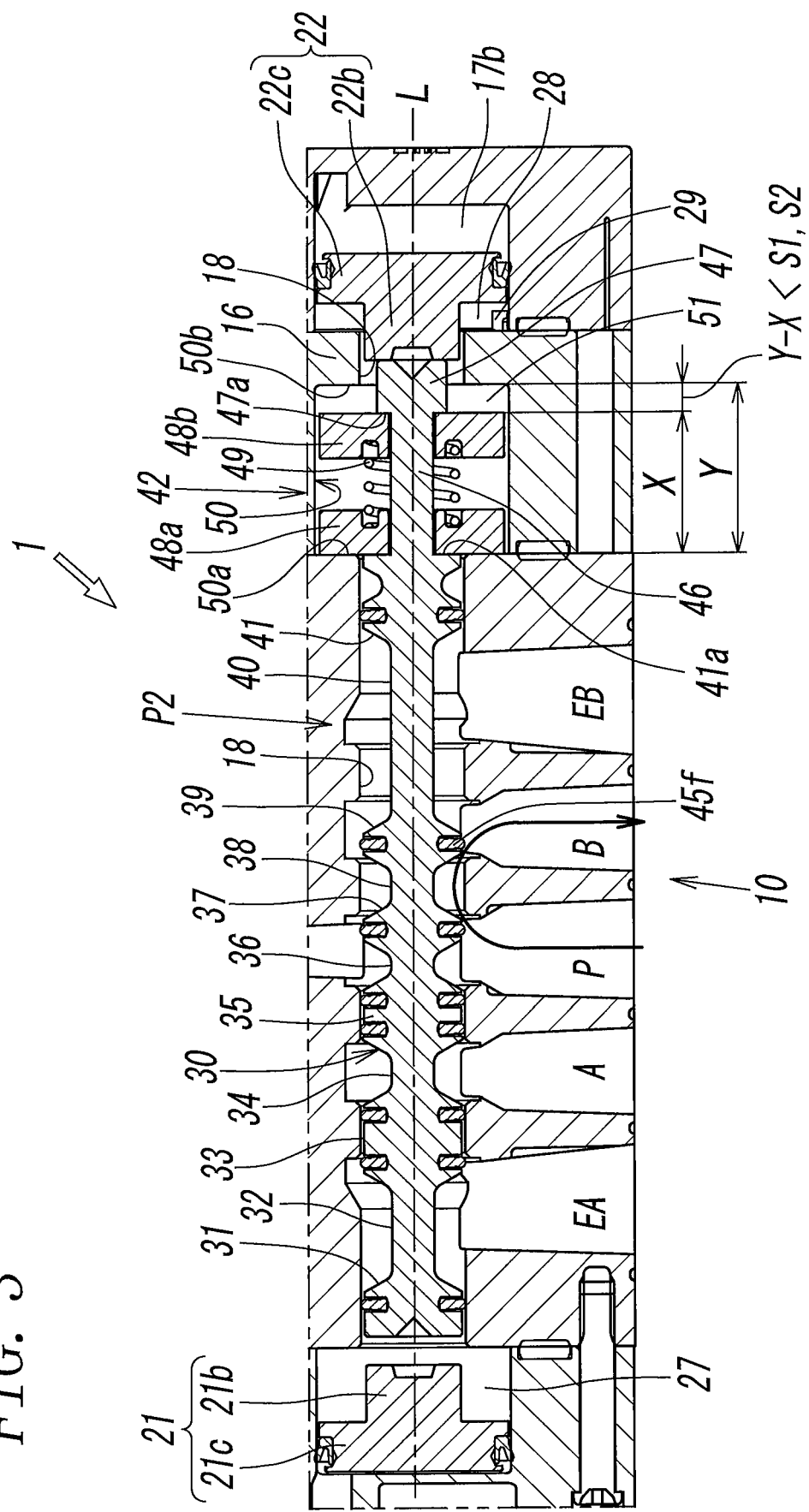
FIG. 3 is a relevant-part cross section of the four-position switching valve in a state in which the spool has been moved to a first intermediate switching position.
Figure 4:
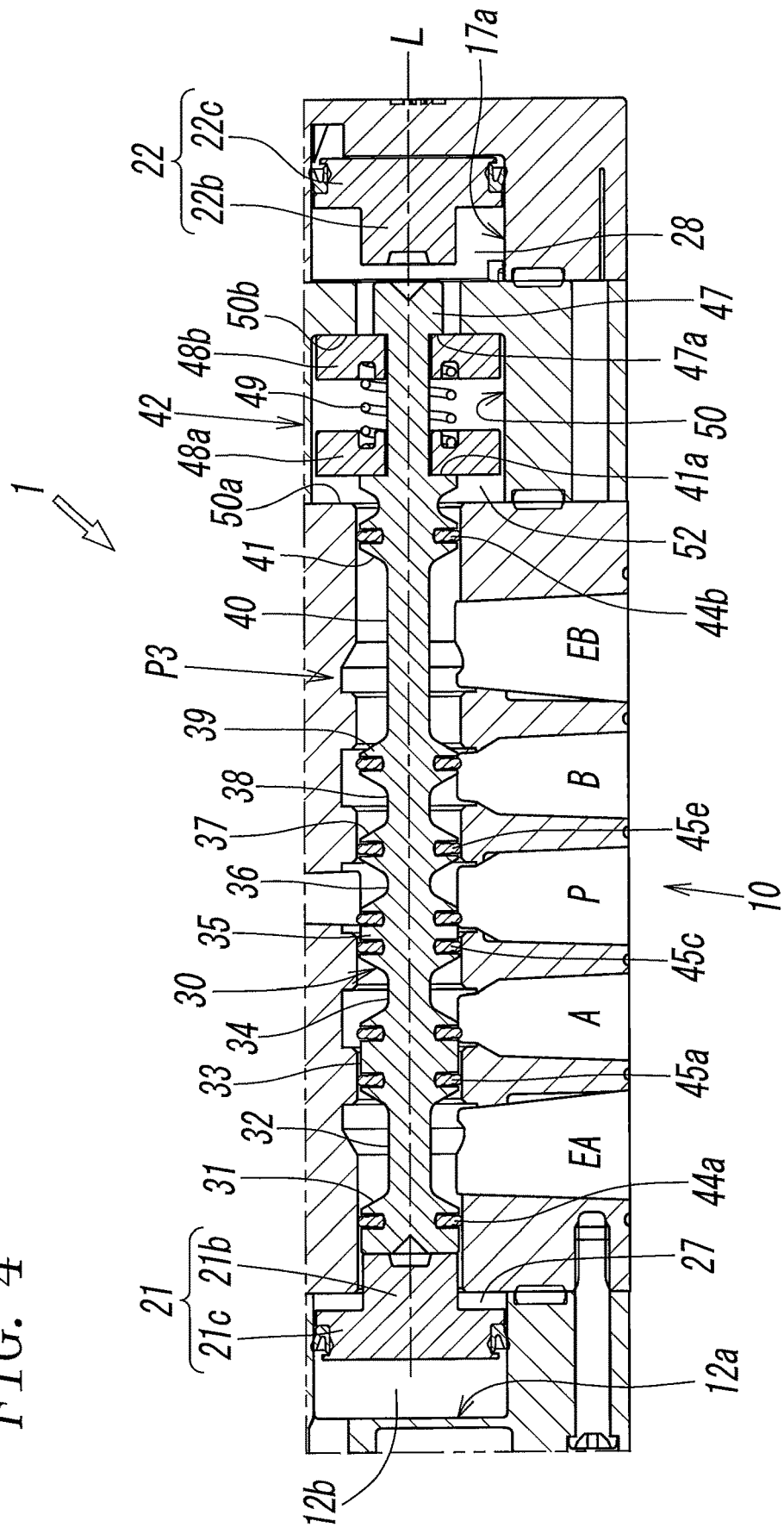
FIG. 4 is a partial cross section of the four-position switching valve in a state in which the spool has been moved to a second intermediate switching position.
Figure 5:
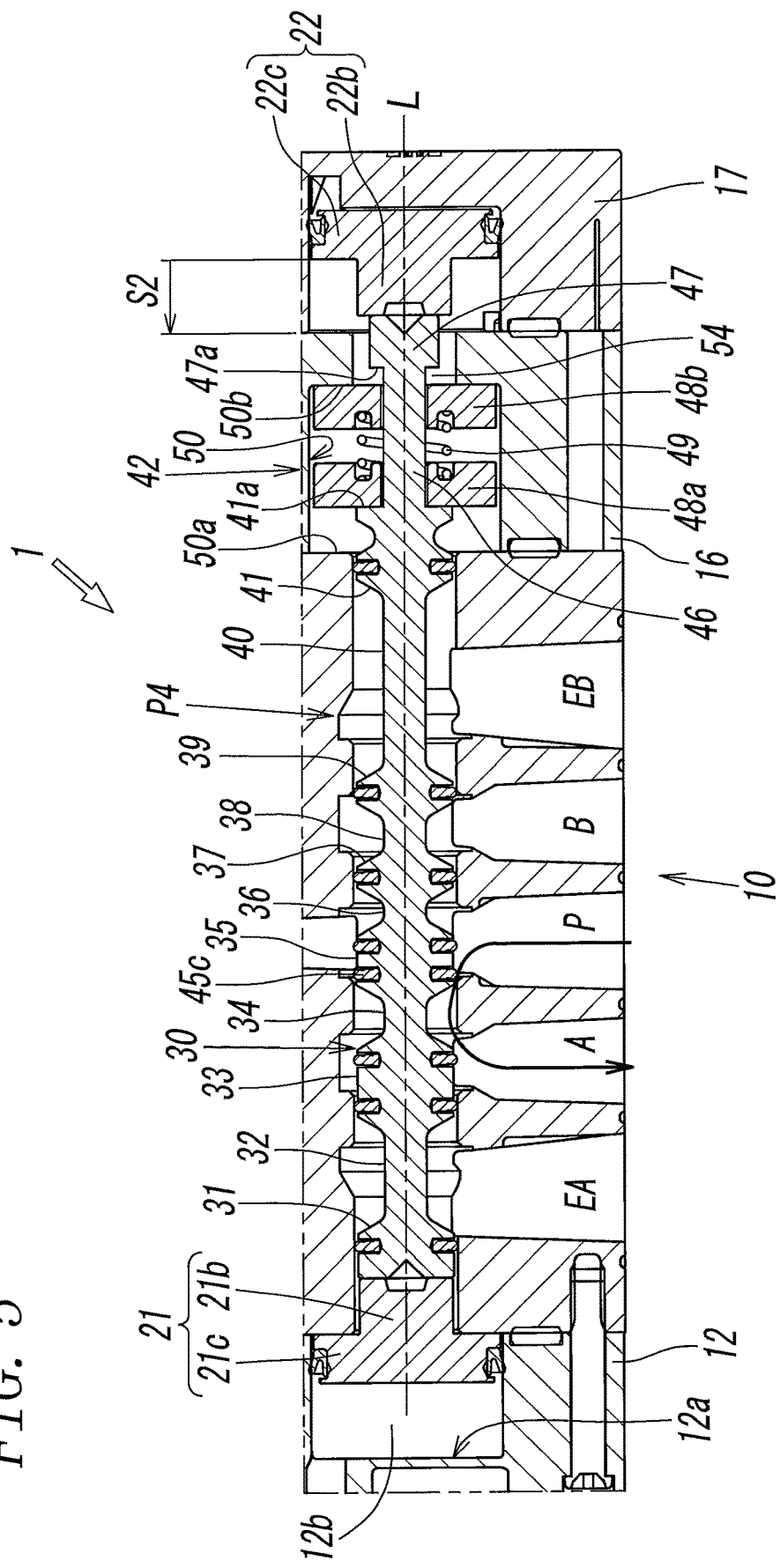
FIG. 5 is a relevant-part cross section of the four-position switching valve in a state in which the spool has been moved to the other-end-side switching position.

By receiving the effect of the pilot air pressure, the first piston 21 and the second piston 22 switch the spool 30 to a one-end-side switching position P1 shown in FIG. 2, a first intermediate switching position P2 shown in FIG. 3, a second intermediate switching position P3 shown in FIG. 4, and another-end-side switching position P4 shown in FIG. 5. The first piston 21 and the second piston 22 have the same shape. A pressure-receiving surface 21a of the first piston 21 faces a first pilot chamber 12b, and a pressure-receiving surface 22a of the second piston 22 faces a second pilot chamber 17b. The first pilot chamber 12b and the second pilot chamber 17b have the same shape.

In this embodiment, the first piston 21 and the second piston 22 have piston body portions 21b and 22b having cylindrical shapes and projecting toward the valve hole 18, and circular flange portions 21c and 22c formed on the opposite sides of the piston body portions 21b and 22b from the valve hole 18 and projecting radially outward. The end faces of the flange portions 21c and 22c on the opposite sides from the piston body portions 21b and 22b form the pressure-receiving surface 21a and 22a.

The pilot valve part 13 is provided with a first pilot valve 14 and a second pilot valve 15. In this embodiment, the first pilot valve 14 and the second pilot valve 15 are disposed to one side of the first piston cover 12 in the axis L direction. The first pilot valve 14 is disposed on the lower side and the second pilot valve 15 is disposed on the upper side in the top-bottom direction, which is perpendicular to the axis L direction.

The first pilot valve 14 is connected to the first pilot chamber 12b through a first pilot output path 24, and the second pilot valve 15 is connected to the second pilot chamber 17b through a second pilot output path 25. The pilot valves 14 and 15 are connected to the supply port P through a pilot supply path 26. The first and second pilot output paths 24 and 25 and the pilot supply path 26 are formed inside the valve body 10.

Furthermore, a back chamber 27 facing the back surface of the first piston 21 and a back chamber 28 facing the back surface of the second piston 22 are open to the air through an open path 29 (see FIG. 3).

As shown in FIG. 2, the spool 30 is formed to have, in sequence in the axis L direction, from one end side in the axis L direction toward the other end side in the axis L direction: a first airtight portion 31, which is fitted to one end side of the valve hole 18 in the axis L direction in a slidable and airtight manner; a first circular recessed portion 32; a first land portion 33; a second circular recessed portion 34; a second land portion 35; a third circular recessed portion 36; a third land portion 37; a fourth circular recessed portion 38; a fourth land portion 39; a fifth circular recessed portion 40; and a second airtight portion 41, which is fitted to the other end side of the valve hole 18 in the axis L direction in a slidable and airtight manner. These portions are formed in cylindrical shapes having centers at the axis L. More specifically, the spool 30 has the circular recessed portions and the land portions, serving as valve portions, that are formed alternately in the axis L direction.

Sliding surfaces formed on the radially outside of the airtight portions 31 and 41 and the land portions 33, 35, 37, and 39 have circular grooves 43 that are open to the radially outside. Ring-shaped sealing gaskets 44a and 44b are accommodated in the grooves 43 in the airtight portions 31 and 41, and circular opening/closing gaskets 45a to 45f are accommodated in the grooves 43 in the land portions 33, 35, 37, and 39. In this embodiment, the widths of the sliding surfaces of the first land portion 33 and the second land portion 35 in the axis L direction are larger than the widths of the sliding surfaces of the third land portion 37 and the fourth land portion 39, and the width of the sliding surface of the first land portion 33 is larger than the width of the sliding surface of the second land portion 35. Furthermore, two opening/closing gaskets 45a and 45b and two opening/closing gaskets 45c and 45d are fitted to the sliding surfaces of the first land portion 33 and the second land portion 35, and one gasket 45e and one gasket 45f are fitted to the sliding surfaces of the third land portion 37 and the fourth land portion 39. The gaskets will be described in detail below.

A spool moving mechanism part 42, which selectively moves the spool 30 to the first intermediate switching position P2 (see FIG. 3) and the second intermediate switching position P3 (see FIG. 4), which are located between the one-end-side switching position P1 and the other-end-side switching position P4 (see FIG. 5) and differ from each other, is provided at the other side of the spool 30 in the axis L direction. In this embodiment, the first intermediate switching position P2 is located closer to one side in the axial direction than the second intermediate switching position P3 is. The spool moving mechanism part 42 includes: a first spring washer 48a and a second spring washer 48b provided on a spring washer shaft 46, extending from the other end of the spool 30 in the axis L direction, so as to be movable in the axis L direction; and a compression spring 49 (spring member) provided between the first spring washer 48a and the second spring washer 48b.

In this embodiment, the spring washer shaft 46 extends from the other end of the second airtight portion 41 in the axis L direction toward the other side in the axis L direction coaxially with the spool 30 and has substantially the same outside diameter as the cylindrically formed circular recessed portions 32, 34, 36, and 38 in the spool 30. A pressure-receiving portion 47 extending toward the other side in the axis L direction is formed at the other end of the spring washer shaft 46 in the axis L direction. The pressure-receiving portion 47 extends coaxially with the spool 30, and has a larger diameter than the spring washer shaft 46 and a smaller diameter than the inside diameter of the valve hole 18. The other end of the spring washer shaft 46 in the axis L direction has a circular second step portion 47a facing one side in the axis L direction. In this embodiment, the second step portion 47a is the end face of the pressure-receiving portion 47 on one side in the axis L direction.

A circular first step portion 41a facing the other side in the axis L direction is formed at the one-side end of the spring washer shaft 46 in the axis L direction. In this embodiment, the first step portion 41a is the end face of the second airtight portion 41 on the other side in the axis L direction. The spring washer shaft 46 is formed between the first step portion 41a and the second step portion 47a. The spring washer shaft 46 is inserted in the spring cover 16, and the first spring washer 48a and the second spring washer 48b are fitted on the spring washer shaft 46 so as to be freely movable in the axis L direction. The first spring washer 48a and the second spring washer 48b are formed in a disc shape and have the same shape. The first spring washer 48a and the second spring washer 48b have holes penetrating in the axis L direction at the centers thereof, and the spring washer shaft 46 is inserted through the holes. The inside diameters of the holes are slightly larger than the outside diameter of the spring washer shaft 46. Hence, the first spring washer 48*a* and the second spring washer 48*b* can move relative to the spring washer shaft 46 in the axis L direction.

The end face of the first spring washer 48*a* on one side in the axial direction can be brought into contact with the first step portion 41*a*, and the end face of the second spring washer 48*b* on the other side in the axial direction can be brought into contact with the second step portion 47*a*. The coil-shaped compression spring 49 is disposed between the first spring washer 48*a* and the second spring washer 48*b*. The compression spring 49 is inserted between the first spring washer 48*a* and the second spring washer 48*b* in a compressed state. The compression spring 49 urges the first spring washer 48*a* and the second spring washer 48*b* such that the first spring washer 48*a* is in contact with and secured to the first step portion 41*a* and such that the second spring washer 48*b* is in contact with and secured to the second step portion 47*a*.

In the valve hole 18 in the spring cover 16, a spring accommodating chamber 50 extending in the axis L direction is formed so as to surround the first spring washer 48*a*, the second spring washer 48*b*, and the compression spring 49. The spring accommodating chamber 50 has a circular cross section and has a larger diameter than the inside diameter of the valve hole 18. The spring accommodating chamber 50 extends from one end toward the other end side of the spring cover 16 in the axis L direction. A circular end wall 50*a* extending radially from the inside to the outside is formed at the one-side end of the spring accommodating chamber 50 in the axis L direction, and a circular end wall 50*b* extending radially from the inside to the outside is formed at the other-side end of the spring accommodating chamber 50 in the axis L direction. As shown in FIG. 3, the length Y, in the axial direction, between the end walls 50*a* and 50*b* on both sides of the spring accommodating chamber 50 in the axis L direction (hereinbelow, "the length Y between a pair of end walls") is larger than the length X, in the axis L direction, between the first step portion 41*a* and the second step portion 47*a* on both sides of the spring washer shaft 46 in the axial direction (hereinbelow, "the length X between a pair of step portions").

A valve hole 18 communicating with the spring accommodating chamber 50 and extending toward the other side in the axis L direction is formed on the other side of the spring cover 16 in the axis L direction. More specifically, the valve hole 18 extends to the other end of the spring cover 16 in the axis L direction. Because the inside diameter of the valve hole 18 is larger than the outside diameters of the pressure-receiving portion 47 and the piston body portion 22*b* of the second piston 22, the pressure-receiving portion 47 and the second piston 22 can move in the axis L direction relative to the valve hole 18.

Now, the distance over which the spool 30 moves in the axis L direction, that is, the stroke length of the spool 30, will be described. In this embodiment, the spool 30 moves to the extreme one side in the axial direction at the one-end-side switching position P1 shown in FIG. 2 and moves to the extreme other side in the axial direction at the other-end-side switching position P4 shown in FIG. 5. Hence, the spool 30 moves over the distance between the one-end-side switching position P1 and the other-end-side switching position P4 (stroke length S). In this embodiment, the stroke length S1, over which the spool 30 moves from one side toward the other side in the axis L direction, and the stroke length S2, over which the spool 30 moves from the other side toward one side in the axis L direction, are equal. Furthermore, as shown in FIGS. 3 and 5, the stroke lengths S1 and S2 are larger than the value obtained by subtracting the length X between the pair of step portions from the length Y between the pair of end walls (Y−X); that is, Y−X<S1, S2.

Hence, when the spool 30 that has been moved to the other-end-side switching position P4, as shown in FIG. 5, is moved toward one side in the axis L direction, as shown in FIG. 2, the second spring washer 48*b* is moved toward the first spring washer 48*a* with the first spring washer 48*a* being in contact with the one end wall 50*a*, and the spool 30 can be moved to the one-end-side switching position P1. Furthermore, when the spool 30 that has been moved to the one-end-side switching position P1, as shown in FIG. 2, is moved toward the other side in the axis L direction, as shown in FIG. 5, the first spring washer 48*a* is moved toward the second spring washer 48*b* with the second spring washer 48*b* being in contact with the other end wall 50*b*, and the spool 30 can be moved to the other-end-side switching position P4.

As shown in FIG. 2, the thus-configured spool 30 of the four-position switching valve 1 is switched to the one-end-side switching position P1 in a state in which the pilot air pressure is applied to the second piston 22, the first spring washer 48*a* is in contact with the one end wall 50*a* of the spring accommodating chamber 50, and the second spring washer 48*b* has moved to one side in the axis L direction against the urging force of the compression spring 49. Furthermore, as shown in FIG. 3, the spool 30 is switched to the first intermediate switching position P2 in a state in which the first spring washer 48*a* is in contact with the one end wall 50*a* of the spring accommodating chamber 50 and the first step portion 41*a*, and the second spring washer 48*b* and the spool 30 have moved toward the other side in the axis L direction due to the return force (elastic force) of the compression spring 49, so that the second spring washer 48*b* is in contact with the second step portion 47*a*.

Furthermore, as shown in FIG. 4, the spool 30 is switched to the second intermediate switching position P3 in a state in which the second spring washer 48*b* is in contact with the other end wall 50*b* of the spring accommodating chamber 50, and the first spring washer 48*a* and the spool 30 have moved to one side in the axis L direction due to the return force (elastic force) of the compression spring 49, so that the first spring washer 48*a* is in contact with the first step portion 41*a*, and the second spring washer 48*b* is in contact with the second step portion 47*a*. Furthermore, as shown in FIG. 5, the spool 30 is switched to the other-end-side switching position P4 in a state in which the pilot air pressure is applied to the first piston 21, the second spring washer 48*b* is in contact with the other end wall 50*b* of the spring accommodating chamber 50, and the first spring washer 48*a* has moved toward the other side in the axis L direction against the urging force of the compression spring 49.

As described, as shown in FIGS. 3 and 4, the spool 30 according to this embodiment can be moved to two intermediate switching positions: the first intermediate switching position P2, to which switching is made as a result of the second spring washer 48*b* and the spool 30 being moved toward the other side in the axis L direction by the return force (elastic force) of the compression spring 49 when the pilot air pressure is not applied to the first piston 21 nor the second piston 22; and the second intermediate switching position P3, which is located to the other side of the first intermediate switching position P2 in the axial direction, to which switching is made as a result of the first spring washer 48a and the spool 30 being moved toward one side in the axis L direction by the return force (elastic force) of the compression spring 49.

Next, the four switching positions P1, P2, P3, and P4 in the four-position switching valve 1 according to this embodiment will be described in detail. As shown in FIGS. 1 and 2, when the second pilot valve 15 is turned on to supply the pilot air pressure to the second pilot chamber 17b, the second piston 22 is pressed toward one side in the axis L direction by the pilot air pressure, moving the spool 30 toward one side in the axis L direction through the second piston 22. As the spool 30 moves toward one side in the axis L direction, the first spring washer 48a moves toward one side in the axis L direction through the second spring washer 48b and the compression spring 49, which are in contact with the second step portion 47a, and comes into contact with the one end wall 50a of the spring accommodating chamber 50, and the second spring washer 48b moves toward the first spring washer 48a against the urging force of the compression spring 49. As a result, the spool 30 is switched to the one-end-side switching position P1 on one end side in the axis L direction. In a state in which the spool 30 has been switched to the one-end-side switching position P1, the second airtight portion 41 of the spool 30 moves toward one side in the axis L direction, leaving a gap 53 with respect to the first spring washer 48a.

Furthermore, when the second pilot valve 15 is turned off in a state in which the spool 30 has been switched to the one-end-side switching position P1, as shown in FIG. 3, the pilot air pressure supplied to the second pilot chamber 17b is eliminated, the second spring washer 48b is pressed toward the other side in the axis L direction by the return force (elastic force) of the compression spring 49, and the second spring washer 48b in contact with the second step portion 47a moves the spool 30 toward the other side in the axis L direction through the pressure-receiving portion 47. Then, when the moving distance of the spool 30 becomes equal to the width of the gap 53 in the axis L direction shown in FIG. 2, the first step portion 41a comes into contact with the first spring washer 48a, stopping the movement of the spool 30 toward the other side in the axis L direction, and thus, the spool 30 is switched to the first intermediate switching position P2.

In a state in which the spool 30 has been switched to the first intermediate switching position P2, a first space 51 is formed between the second spring washer 48b and the other end wall 50b of the spring accommodating chamber 50.

Furthermore, as shown in FIGS. 1 and 5, when the first pilot valve 14 is turned on to supply the pilot air pressure to the first pilot chamber 12b, the first piston 21 is pressed toward the other side in the axis L direction by the pilot air pressure, moving the spool 30 toward the other side in the axis L direction through the first piston 21. Along with the movement of the spool 30 toward the other side in the axis L direction, the first spring washer 48a and the second spring washer 48b, which are in contact with the first step portion 41a, move toward the other side in the axis L direction, the second spring washer 48b comes into contact with the other end wall 50b of the spring accommodating chamber 50, and the first spring washer 48a moves toward the second spring washer 48b against the urging force of the compression spring 49. As a result, the spool 30 is switched to the other-end-side switching position P4. In a state in which the spool 30 has been switched to the other-end-side switching position P4, the pressure-receiving portion 47 of the spool 30 moves toward the other side in the axis L direction, leaving a gap 54 with respect to the second spring washer 48b.

Furthermore, as shown in FIGS. 1 and 5, in a state in which the spool 30 has been moved to the other-end-side switching position P4, when the first pilot valve 14 is turned off, as shown in FIG. 4, the pilot air pressure supplied to the first pilot chamber 12b is eliminated, the first spring washer 48a is pressed toward one side in the axis L direction by the return force (elastic force) of the compression spring 49, and the spool 30 moves toward one side in the axis L direction along with the movement of the first spring washer 48a, which is in contact with the first step portion 41a, toward one side in the axis L direction. At this time, when the moving distance of the spool 30 becomes equal to the width of the gap 54 in the axis L direction shown in FIG. 5, the second spring washer 48b comes into contact with the second step portion 47a, stopping the movement of the spool 30 toward one side in the axis L direction, and thus, the spool 30 is switched to the second intermediate switching position P3.

In a state in which the spool 30 has been switched to the second intermediate switching position P3, a second space 52 is formed between the first spring washer 48a and the one end wall 50a of the spring accommodating chamber 50. The width of the second space 52 in the axis L direction is equal to that of the above-described first space 51 (see FIG. 3).

As shown in FIG. 2, when the spool 30 is switched to the one-end-side switching position P1, the four-position switching valve 1 becomes in a first non-communication state, in which the supply port P, the first output port A, the second output port B, and the first discharging port EA are shut off and do not communicate with one another. Furthermore, when the spool 30 is switched to the first intermediate switching position P2, as shown in FIG. 3, the four-position switching valve 1 becomes in a first communication state, in which the first output port A and the first discharging port EA are shut off and do not communicate each other while the supply port P and the second output port B communicate with each other.

Furthermore, when the spool 30 is switched to the second intermediate switching position P3, as shown in FIG. 4, the four-position switching valve 1 becomes in a second non-communication state, in which the supply port P, the first output port A, the second output port B, the first discharging port EA, and the second discharging port EB are all shut off and do not communicate with one another. Furthermore, when the spool 30 is switched to the other-end-side switching position P4, as shown in FIG. 5, the four-position switching valve 1 becomes in a second communication state, in which the second output port B, the first discharging port EA, and the second discharging port EB are shut off and do not communicate with one another while the supply port P and the first output port A communicate with each other.

As shown in FIG. 2, the spool 30 is provided with six, i.e., the first to the sixth, opening/closing gaskets 45a to 45f that open and close the flow paths connecting the adjoining ports and two sealing gaskets 44a and 44b that normally seal both ends of the valve hole 18, which gaskets serving as means for opening and closing the flow paths of the compressed air flowing between the adjoining ports. The opening/closing gaskets 45a to 45f are provided on the land portions 33, 35, 37, and 39, and the sealing gaskets 44a and 44b are provided on the first airtight portion 31 and the second airtight portion 41.

Among the six opening/closing gaskets (hereinbelow, simply "gaskets") 45a to 45f, the sixth gasket 45f counted from the first piston 21 side opens the flow path between the adjoining ports P and B when the spool 30 is switched to the first intermediate switching position P2 (see FIG. 3). Furthermore, the third gasket 45c counted from the first piston 21 side opens the flow path between the adjoining ports A and P when the spool 30 is switched to the other-end-side switching position P4 (see FIG. 5).

Furthermore, the second, fourth, and sixth gaskets 45b, 45d, and 45f counted from the first piston 21 side shut off the flow paths between the adjoining ports EA, A, P, and B when the spool 30 is switched to the one-end-side switching position P1. Furthermore, as shown in FIG. 4, the first, third, and fifth gaskets 45a, 45c, and 45e counted from the first piston 21 side shut off all the flow paths between the adjoining ports EA, A, P, and B when the spool 30 is switched to the second intermediate switching position P3.

Meanwhile, the two sealing gaskets 44a and 44b normally seal both ends of the valve hole 18 regardless of which switching position the spool 30 is located.

In the thus-configured four-position switching valve 1, the spring accommodating chamber 50 is formed in the valve hole 18 that accommodates one spool 30 in a manner allowing sliding thereof. By making the length Y of the spring accommodating chamber 50 in the axis L direction larger than the length X of the spring washer shaft 46 of the spool 30 in the axis L direction, and by providing the spool 30 moving mechanism part 42 on the spring washer shaft 46 provided on the spool 30, it is possible to move the spool 30 to the two switching positions (the first intermediate switching position P2 and the second intermediate switching position P3) in addition to the one-end-side switching position P1 and the other-end-side switching position P4. Accordingly, it is possible to provide a four-position switching valve 1 that has a simple structure and that can be easily manufactured, compared with the conventional four-position switching valve, in which two spools and two return springs are provided in the valve hole.

Furthermore, as shown in FIGS. 2 and 3, in an emergency, such as when the power supply to the second pilot valve 15 (see FIG. 1) is shut off in a state in which the spool 30 has been switched to the one-end-side switching position P1, it is possible to switch the spool 30 to the first intermediate switching position P2, in which the supply port P and the second output port B communicate with each other, with the return force (elastic force) of the compression spring 49. Therefore, for example, when a vacuum generator, such as an ejector, is connected to the second output port B, because it is possible to maintain the vacuum generator in an operating state in an emergency, and thus, it is possible to maintain the vacuum state of the device that has been brought to a vacuum by the vacuum generator.

Furthermore, as shown in FIGS. 4 and 5, in an emergency, such as when the power supply to the first pilot valve 14 (see FIG. 1) is shut off in a state in which the spool 30 has been switched to the other-end-side switching position P4, it is possible to switch the spool 30 to the second intermediate switching position P3, in which all the ports are shut off, with the return force (elastic force) of the compression spring 49. Therefore, for example, when a vacuum generator, such as an ejector, is connected to the second output port B, because the vacuum generator becomes in a non-operating state in an emergency, it is possible to stop vacuum breaking of the device that has been brought to a vacuum by the vacuum generator.

Figure 6:
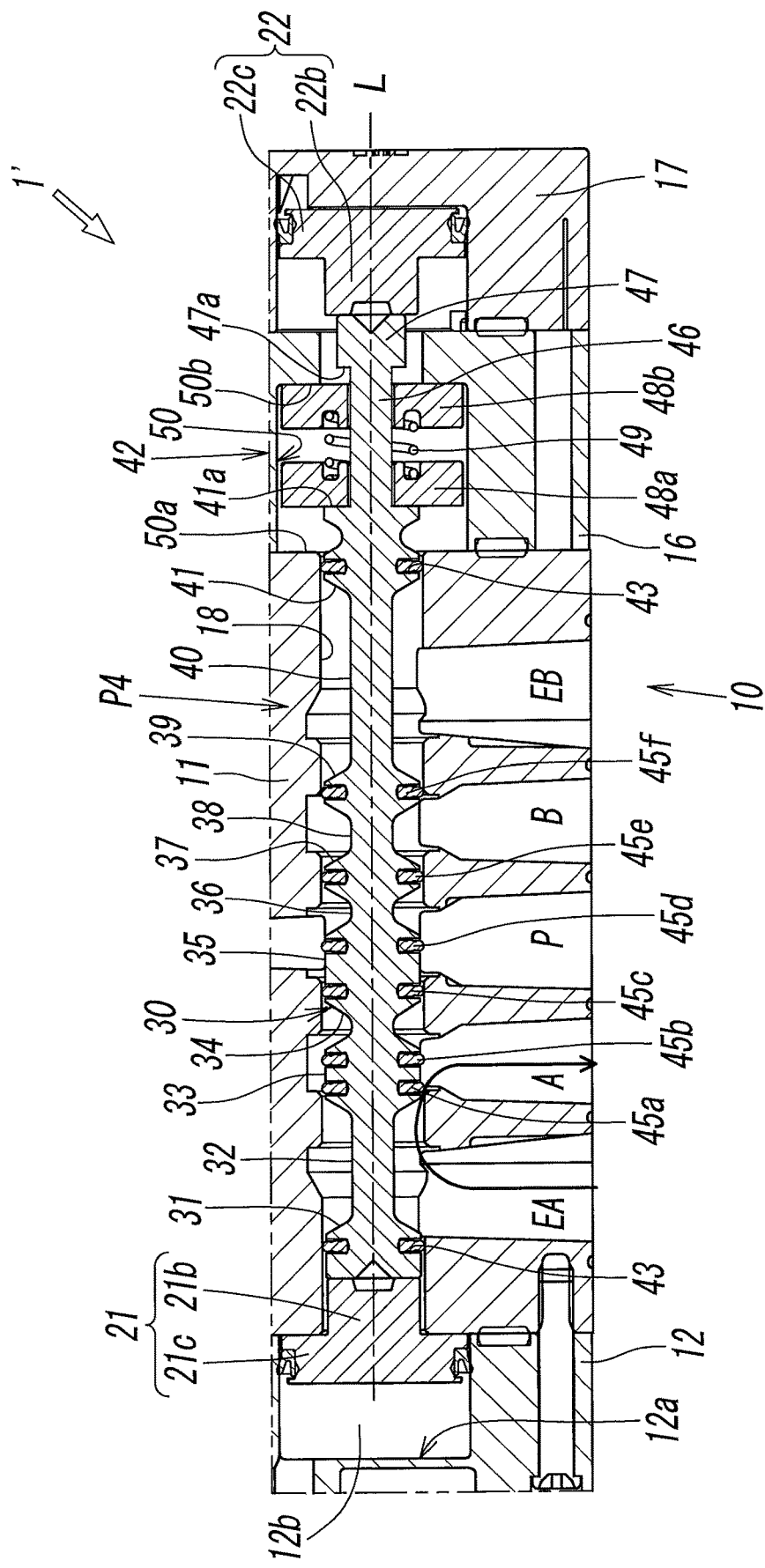
FIG. 6 is a relevant-part cross section of a four-position switching valve according to a modification in a state in which the spool has been moved to the other-end-side switching position.

In the four-position switching valve 1 according to the above-described embodiment, the case where the second communication state, in which the second output port B, the first discharging port EA, and the second discharging port EB are shut off and do not communicate with one another while the supply port P and the first output port A communicate with each other, is established when the spool 30 is switched to the other-end-side switching position P4 has been described. However, the configuration is not limited to this. As shown in FIG. 6, a four-position switching valve 1' in which the third communication state, in which the supply port P, the second output port B, and the second discharging port EB are shut off and do not communicate with one another while the first output port A and the first discharging port EA communicate with each other, is established when the spool 30 is switched to the other-end-side switching position P4 is also possible. Note that, regarding the four-position switching valve 1' shown in FIG. 6, the portions that differ from the above-described four-position switching valve 1 will be described, and the portions that are the same as those in the above-described four-position switching valve 1 will be denoted by the same reference signs, and the descriptions thereof will be omitted.

In this case, the four-position switching valve 1' is configured such that the width of the first land portion 33 in the axis L direction is smaller than that of the second land portion 35. With this configuration, when the spool 30 is switched to the other-end-side switching position P4, the first gasket 45a counted from the first piston 21 side opens the flow path between the adjoining ports EA and A, and the third gasket 45c counted from the first piston 21 side shuts off the supply port P and the first output port A so as not to communicate with each other.

Therefore, for example, when a device to be brought to a vacuum is connected to the first output port A, once the spool 30 is switched to the other end-side switching position P4, the atmospheric pressure flows into the device from the port EA through the first output port A, enabling the vacuum state of the device to be broken.

Although the illustrated four-position switching valves 1 and 1' are configured as five-port valves, the present invention may be applied to a four-position switching valve composed of a four-port valve. Furthermore, although the first piston 21 and the second piston 22 have been shown as the driving parts for moving the spool 30 in the four-position switching valve 1 according to the above-described embodiment, the configuration is not limited thereto. The first and second pistons 21 and 22 may be omitted, and the first and second pilot chambers 12b and 17b, into which the pilot air pressure flows, may be used as the driving parts for the spool 30. In that case, it is possible to move the spool 30 in the axis L direction by directly applying the pilot air pressure to the ends of the spool 30 in the axis L direction through the first and second pilot chambers 12b and 17b.

REFERENCE SIGNS LIST 1, 1' four-position switching valve
10 valve body (body)
11 main body
12 first piston cover
12a, 17a piston chamber
12b first pilot chamber
13 pilot valve part
14 first pilot valve
15 second pilot valve
16 spring cover
17 second piston cover
17b second pilot chamber
18 valve hole
21 first piston (first driving part)

21a and 22a pressure-receiving surface
21b, 22b piston body portion
21c and 22c flange portion
22 second piston (second driving part)
24 first pilot output path
25 second pilot output path
26 pilot supply path
27, 28 back chamber
29 open path
30 spool
31 first airtight portion
32 first circular recessed portion
33 first land portion
34 second circular recessed portion
35 second land portion
36 third circular recessed portion
37 third land portion
38 fourth circular recessed portion
39 fourth land portion
40 fifth circular recessed portion
41 second airtight portion
41a first step portion (contact portion)
42 spool moving mechanism part
43 groove
44a and 44b sealing gasket
45a, 45b, 45c, 45d, 45e, 45f opening/closing gasket
46 spring washer shaft
47 pressure-receiving portion
47a second step portion (contact portion)
48a first spring washer
48b second spring washer
49 compression spring (spring member)
50 spring accommodating chamber
50a one end wall (stopper portion)
50b the other end wall (stopper portion)
51 first space portion
52 second space portion
53, 54 gap
A first output port (port)
B second output port (port)
EA first discharging port (port)
EB second discharging port (port)
L axis
P supply port (port)
P1 one-end-side switching position
P2 first intermediate switching position
P3 second intermediate switching position
P4 the other-end-side switching position

The invention claimed is:

1. A four-position switching valve comprising:
a body having a valve hole extending from one end side toward the other end side in an axial direction and a plurality of ports communicating with the valve hole;
a spool accommodated in the valve hole in the body so as to be slidable in the axial direction;
a first driving part that is disposed at one end of the spool in the axial direction and presses the spool toward the other end side in the axial direction to move the spool to another-end-side switching position;
a second driving part that is disposed at the other end of the spool in the axial direction and presses the spool toward one end side in the axial direction to move the spool to a one-end-side switching position; and
a spool moving mechanism part that selectively moves the spool to a first intermediate switching position and a second intermediate switching position, which are located between the one-end-side switching position and the other-end-side switching position and differ from each other, a communication state among the plurality of ports being switched by moving the spool to the four switching positions with the first and second driving parts and the spool moving mechanism part,
wherein the spool moving mechanism part has a spring member that accumulates an elastic force for pushing-back the spool in the direction of the one-end-side switching position as the first driving part moves the spool to the other-end-side switching position and accumulates an elastic force for pushing-back the spool in the direction of the other-end-side switching position as the second driving part moves the spool to the one-end-side switching position, whereby the spool moving mechanism part presses the spool toward the other end side in the axial direction with the elastic force of the spring member and moves the spool to the first intermediate switching position when a pressure applied to the spool by the second driving part is removed in a state in which the spool has been moved to the one-end-side switching position, and presses the spool toward one side in the axial direction with the elastic force of the spring member and moves the spool to the second intermediate switching position when the pressure applied to the spool by the first driving part is removed in a state in which the spool has been moved to the other-end-side switching position.

2. The four-position switching valve according to claim 1, wherein
the spool has a coaxial spring washer shaft,
the spool moving mechanism part further has a first spring washer at one end side in the axial direction and a second spring washer at the other end side in the axial direction on the spring washer shaft so as to be movable in the axial direction,
the spring member is provided between the first spring washer and the second spring washer,
the spring washer shaft has a pair of contact portions at both ends in the axis axial direction with which the first and second spring washers come into contact,
the spring member is contracted in a state in which the first and second spring washers are in contact with the pair of contact portions,
the valve hole in the body has, on both sides thereof in the axial direction with the spool moving mechanism part therebetween, a pair of stopper portions with which the first and second spring washers come into contact, and
relationships X<Y and Y−X<S1, S2 are satisfied, where X is a length between the pair of contact portions in the axial direction, Y is a length between the pair of stopper portions in the axial direction, and S1 and S2 are stroke lengths of the spool with the first and second driving parts, respectively.

3. The four-position switching valve according to claim 2, wherein
the valve hole is provided with a spring accommodating chamber that accommodates the spool moving mechanism part and extends in the axial direction,
the spring accommodating chamber has a pair of end walls extending radially outward at both ends in the axial direction, and
the pair of end walls respectively include the stopper portions with which the first and second spring washers come into contact.

4. The four-position switching valve according to claim 3, wherein an inside diameter of the spring accommodating chamber is larger than an inside diameter of the valve hole, and outside diameters of the first spring washer and the second spring washer are larger than the inside diameter of the valve hole and smaller than the inside diameter of the spring accommodating chamber.

5. The four-position switching valve according to claim 3, wherein the pair of contact portions include a first step portion that projects radially outward from one end of the spring washer shaft in the axial direction and can come into contact with the first spring washer and a second step portion that projects radially outward from the other end of the spring washer shaft in the axial direction and can come into contact with the second spring washer, and the spool is switched to the first intermediate switching position in a state in which the first spring washer is in contact with the first step portion and the end wall of the spring accommodating chamber on one side in the axial direction and in which the second spring washer is in contact with the second step portion, and is switched to the second intermediate switching position in a state in which the second spring washer is in contact with the second step portion and the end wall of the spring accommodating chamber on the other side in the axial direction and in which the first spring washer is in contact with the first step portion.

6. The four-position switching valve according to claim 1, wherein the plurality of ports include a supply port, a first output port, a second output port, a first discharging port, and a second discharging port, a first non-communication state, in which the supply port, the first output port, the second output port, and the first discharging port are shut off and do not communicate with one another, is established at the one-end-side switching position, a first communication state, in which the first output port and the first discharging port are shut off and do not communicate with each other while the supply port and the second output port communicate with each other, is established at the first intermediate switching position, a second non-communication state, in which the supply port, the first output port, the second output port, the first discharging port, and the second discharging port are all shut off and do communicate with one another, is established at the second intermediate switching position, and a second communication state, in which the second output port, the first discharging port, and the second discharging port are shut off and do not communicate with one another while the supply port and the first output port communicate with each other, is established at the other-end-side switching position or a third communication state, in which the supply port, the second output port, and the second discharging port are shut off and do not communicate with one another while the first output port and the first discharging port communicate with each other, is established at the other-end-side switching position.

* * * * *